Figure 1:
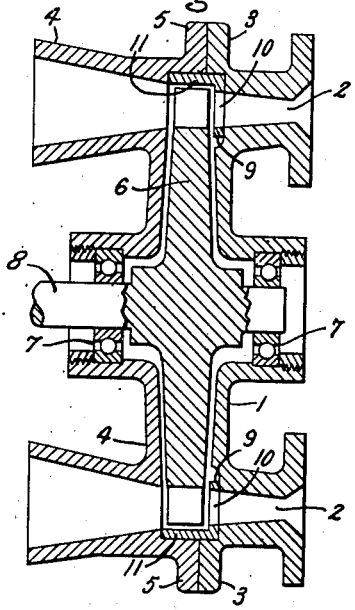

Jan. 18, 1949.  D. H. GRAHAM ET AL  2,459,519
SPEED LIMITING ARRANGEMENTS FOR TURBINE ROTORS
Filed March 16, 1948

Inventors:
Douglas H. Graham,
Bengt. E. G. Forsling,
George Tabberer.
by Prarell S. Mack
Their Attorney.

Patented Jan. 18, 1949

2,459,519

UNITED STATES PATENT OFFICE 2,459,519

SPEED LIMITING ARRANGEMENTS FOR TURBINE ROTORS

Douglas H. Graham, Coventry, Bengt E. G. Forsling, Rugby, and George Tabberer, Coventry, England, assignors to General Electric Company, a corporation of New York Application March 16, 1948, Serial No. 15,234
In Great Britain June 16, 1947

4 Claims. (Cl. 253—59)

This invention relates to fluid pressure turbines particularly to speed limiting devices for turbine-type starter motors for internal combustion power plants.

Particularly in aircraft service, it is desirable and customary to provide motive fluid for driving starters of the above-mentioned type from the combustion of suitable fluid in a limited space so as to form gases under pressure. In such cases the fuel is usually stored in "cartridges" which are provided with sufficient fuel for the starting operation. The amount of fuel necessary to provide sufficient energy for starting a particular engine or gas turbine is determined by experiment, and precisely this amount of fuel is thereafter provided in each individual cartridge.

The invention may be used with gas turbines and also with reciprocating engines having moving parts of considerable mass, since either of these types of power plant require the expenditure of considerable energy in order to effect starting. If, during the starting operation, the starter becomes disconnected from its load, as for example due to the power plant accelerating under its own power rather early in the starting cycle, or due to failure of the driving mechanism, or for any reason whatever, the condition may arise where considerable unexpended energy still remains in the cartridge which can serve no purpose except to accelerate and perhaps overspeed the turbine rotor. In such case the final or limiting speed of the starter which would be attained would be dependent upon the inertia of the rotating mass of the starting device and upon the amount of the remaining energy in the cartridge at the time the starter became disconnected from the power plant. It is generally impractical to provide the rotating parts of the starter with sufficient inertia to prevent overspeeding of the starter, particularly in the case of aircraft applications, since this would require more space and weight than is usually permissible. Furthermore, with increased inertia in the starting rotor, a starting cartridge of larger size would be required because of the larger mass to be accelerated to starting speed. As previously indicated, this problem is particularly important in starting gas turbine type power plants or reciprocating power plants having moving parts of considerable mass, because the large masses to be accelerated generally require the use of a comparatively large starting cartridge. Thus it is apparent that in certain applications employing large starting cartridges, there may be sufficient unexpended energy available to accelerate the starter turbine rotor to its bursting speed within a very short time interval.

Accordingly, it is an object of this invention to provide novel arrangements which will prevent turbine type starting motors from reaching an unsafe speed, which arrangements are mechanically simple, quick acting, and light in weight.

Figure 2:
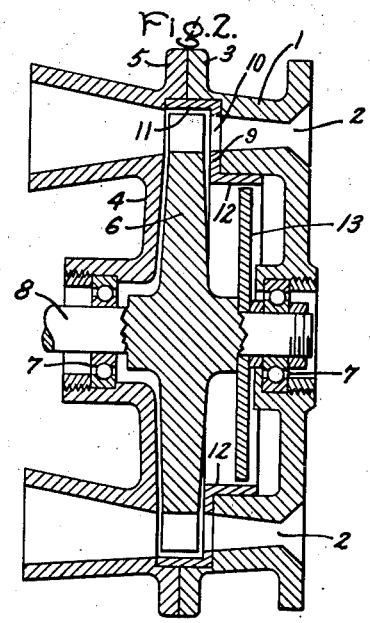
Figure 4:
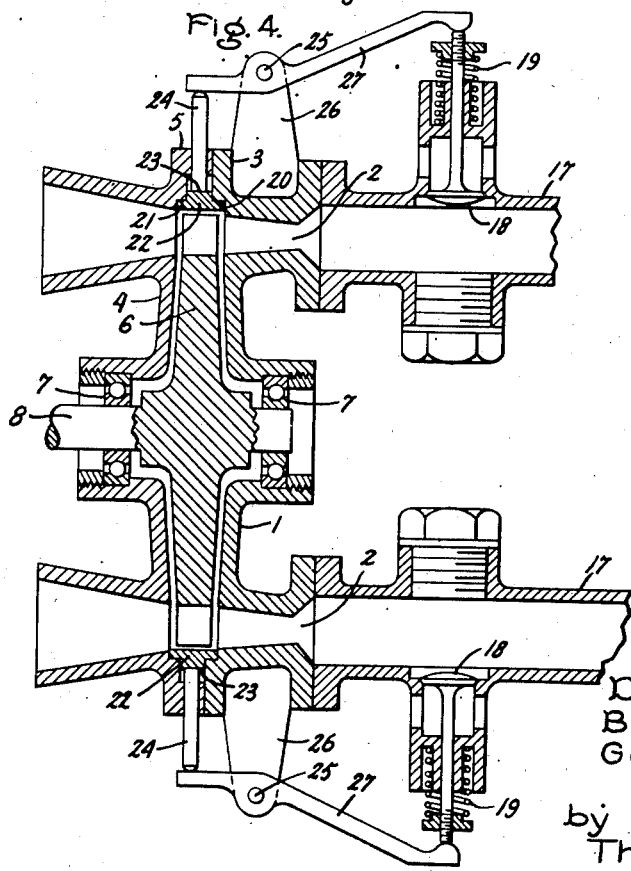
Figure 3:
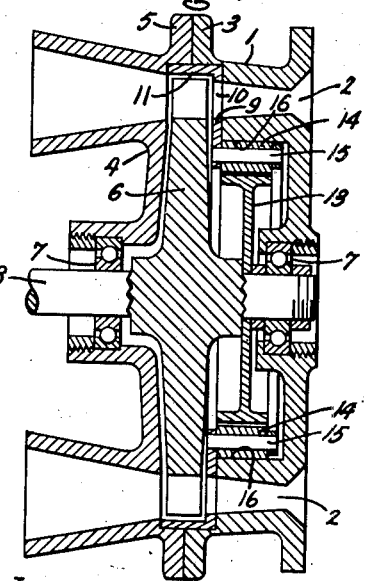

Other objects and advantages will be apparent from the following description taken in connection with the accompanying drawings, in which Fig. 1 is a sectional view of a turbine type starter motor in accordance with the invention; Fig. 2 is another sectional view illustrating a modified arrangement of the invention; and Figs. 3 and 4 are sectional views of still further modifications.

Referring now to Fig. 1, a turbine inlet casing is illustrated at 1 in which are defined a plurality of nozzles 2. For purposes of assembly and disassembly and for additional reasons which will appear later, the inlet casing is provided with a flanged portion 3 for the attachment of an exhaust casing 4 having a mating flanged portion 5. A bladed rotor 6 is rotatably mounted in suitable bearings 7 which are in turn supported in casings 1 and 4. The rotor shaft 8 may be formed integrally with the rotor 6 or may be secured thereto by suitable key or spline means. One end of shaft 8 is adapted to be connected to the engine or gas turbine to be started through a suitable clutch (not shown).

To restrict the flow of motive fluid from the nozzles 2 through the bladed rotor 6, an annular "nozzle control plate" 9 is provided, which is supported in suitable rabbeted portions provided in casings 1 and 4. It will be appreciated by those skilled in the art that, by the proper choice of fits and clearances, plate 9 may be effectively restrained from substantial radial or axial movements while being capable of angular movement relative to nozzles 2.

In order to permit the free flow of motive fluid from the nozzles 2 through the blading of the turbine rotor 6 during periods of normal operation, a plurality of openings 10, having an area and center-to-center spacing corresponding to that of the nozzles 2, are provided in plate 9. It will be seen that when plate 9 is aligned in the proper position with respect to nozzles 2, openings 10 cooperate with the nozzles to form the discharge portion of the nozzle passages.

To prevent substantial axial movement of plate 9, a rim portion 11 is provided which surrounds the bladed rotor and forms a close clearance at the periphery thereof. Plate 9 and its rim portion 11 may be held stationary with openings 10 in alignment with nozzles 2 by any suitable means, as for example by friction or by means of small shear pins (not shown), or other simple mechanical expedients which will be obvious to those skilled in the art. Suitable stops (not shown) may be provided which limit the angular movement of plate 9.

In operation, motive fluid is supplied under pressure to the turbine nozzles 2. Plate 9 is arranged in cooperative alignment with nozzles 2 as previously indicated. This permits the motive fluid to pass first through nozzles 2, then through the bladed rotor 6, and finally through the exhaust casing 4. Assume now that for any reason whatever, the rotor reaches an abnormal rotational speed. Since the rotor stresses are a function of the rotational speed, the increased stresses will cause radial stretching of the bladed rotor. The overall diameter of the rotor will therefore increase, thus taking up the clearance space between the outer diameter of the rotor 6 and the inner diameter of the rim portion 11. The frictional force arising from the rubbing of the rotor against rim portion 11, thus provides sufficient torque to cause plate 9 to shift angularly. In the first instance, openings 10 are cooperatively aligned with nozzles 2, and in other positions, openings 10 in plate 9 are between adjacent nozzles, thereby partially or completely blocking the flow passage. In consequence the motive fluid is partially restricted or completely prevented from reaching and passing through the bladed rotor so that no further speed increase can occur.

The precise value of the clearance space to be used between the rim portion 11 and the outer diameter of rotor 6 may be ascertained from a consideration of the physical properties of the material used in the rotor construction and the degree of overspeeding which is considered to be permissible.

Fig. 2 shows a further development of the invention. This arrangement is similar to that shown in Fig. 1, except that the plate 9 is provided with an axially extending cylindrical portion 12 surrounding a disk 13 which is separate from, but rotates at the same speed as, rotor 6.

In operation, upon reaching a pre-determined speed condition, disk 13 stretches and comes into engagement with the axially extending cylindrical portion 12 surrounding the disk as a result of the radial stretching thereof. As previously indicated, the frictional force arising from the rubbing of disk 13 against the cylindrical portion 12 provides sufficient torque to cause angular displacement of plate 9 relative to the nozzles 2. This results in blocking or in partially restricting the flow of motive fluid to the turbine rotor as previously described in connection with Fig. 1. This embodiment of the invention has the advantage that the need for close clearance between the rim portion 11 in Fig. 1, and the periphery of the hot and highly stressed rotor 6 is eliminated. It has the additional advantage that by a suitable choice of dimensions and materials, the disk 13 can be made to engage cylindrical portion 12 to restrict the flow of motive fluid in the manner described at a predetermined speed which is well within the safe speed range of the bladed rotor 6, before any appreciable stretching of the rotor 6 has taken place.

A further refinement of the invention is illustrated in Fig. 3. In this arrangement, a plurality of axially extending rollers 14 are rotatably supported on stub shafts 15 which are in turn supported by plate 9. Rollers 14 engage in cylindrical portion 16 of casing 1, and are radially spaced from the outer periphery of disk 13.

In operation, this arrangement functions in a manner similar to that previously described in connection with Fig. 2. At some predetermined speed, sufficient radial stretching of disk 13 occurs so that the radial spacing between the outer periphery of the disk and the rollers 14 is completely taken up and the disk comes into engagement with the rollers, thereby causing angular movement of plate 9 to restrict the flow of motive fluid as previously described in connection with Fig. 1 and 2.

In the arrangement shown in Fig. 4, motive fluid is conveyed by means of conduits 17 to the turbine nozzles 2. In order to by-pass the motive fluid from the turbine during periods when there is a tendency for the rotor to overspeed, valve means 18 are provided in conduit 17. Poppet valves are illustrated in Fig. 4, but it will be appreciated that other suitable valve means may be employed. During normal periods of operation, valves 18 are maintained in a closed position by means of compression springs 19. Recessed portions 20, 21 are provided in casings 1 and 4 to accommodate a ring member 22 forming a shroud which surrounds the outer periphery of the turbine rotor 6 and forms a close clearance therewith. The outer periphery of shroud ring 22 is shaped to form a cam surface 23. Plungers 24 are slidably mounted in suitable openings provided in the flanged portion 5 of exhaust casing 4, and these plungers are arranged to bear against the cam surface 23. Pins 25 are supported by brackets 26 which may be attached to inlet casing 1 by any convenient means. Lever members 27 are pivoted on pins 25 and arranged to bear at one end upon plungers 24 and at the other end upon the stems of valves 18.

By the selection of proper fits and clearances, shroud 22 is restrained from axial movement, but is permitted to move angularly with respect to the turbine casing. Like the nozzle control plate 9, shroud ring 22 is normally held stationary by friction, or by any suitable equivalent. The amount of angular movement which shroud ring 22 is permitted, may be limited by suitable stops (not shown).

In operation, motive fluid may be supplied under pressure from a suitable "cartridge" or other source through conduits 17 to turbine nozzles 2. As previously indicated, valves 18 are maintained in a closed position due to the action of compression springs 19, thus causing all the motive fluid to flow through turbine nozzles 2, then through the bladed rotor 6, and finally through the exhaust casing 4. If the turbine rotor tends to reach an abnormal rotational speed, the increased stresses will cause radial stretching of the rotor as previously indicated. The frictional force arising from the rubbing of the turbine rotor against the inner diameter of shroud ring 22 provides sufficient torque to cause angular movement of the shroud ring. Rotation of ring 22 brings the profiled section of the cam portions 23 against plungers 24, thus forcing them radially outward. This motion is transmitted by means of levers 27 to valves 18 causing them to open against the action of springs 19. It will be appreciated that this action causes the motive fluid to be by-passed to the atmosphere without passing through the turbine, thus preventing overspeeding of the rotor beyond safe limits.

It will be seen that the invention provides speed limiting arrangements for a turbine rotor which are mechanically simple, relatively inexpensive, yet capable of protecting the rotor from destructive overspeeds.

While particular embodiments of the invention have been illustrated and described, it will be apparent to those familiar with the art that various changes and modifications may be made without departing from the invention, and it is intended to cover in the appended claims all such changes and modifications that come within the true spirit and scope of the invention.

What I claim as new and desire to secure by Letters Patent of the United States is:

1. In a turbine comprising a casing, a bladed rotor rotatably supported in the casing, and nozzle means for directing motive fluid through the turbine rotor, the combination of speed limiting means including a movable member supported in the casing between the nozzle means and the rotor, means adapted to locate said member axially and radially while permitting limited angular movement relative to the nozzle means, said member defining at least one opening adapted to effect free passage of motive fluid to the rotor in one position and to restrict passage of fluid in another position, said movable member including an axially extending portion radially spaced from a peripheral portion of the rotor, said rotor portion being adapted to stretch radially upon attaining a predetermined speed into engagement with said axially extending portion whereby the movable member is caused to move to the fluid restricting position.

2. In a turbine comprising a casing, a bucket wheel rotatably supported in the casing, and nozzle means for directing motive fluid through the bucket wheel, the combination of speed limiting means including a movable member supported in the casing between the nozzle means and the bucket wheel, means adapted to locate said member radially and axially while permitting limited angular movement relative to the nozzle means, said member defining at least one opening adapted to effect passage of motive fluid to the wheel in one position and to restrict passage of fluid in another position, said movable member including an axially extending portion, radially spaced from and surrounding the outer periphery of the bucket wheel, said wheel being adapted to stretch radially upon attaining a predetermined speed into engagement with said axially extending portion whereby the movable member is caused to move to the fluid restricting position.

3. In a turbine comprising a casing, a bladed rotor rotatably supported in the casing, and nozzle means for directing motive fluid through the turbine rotor, the combination of speed limiting means including a movable member supported in the casing between the nozzle means and the rotor, means adapted to locate said member axially and radially while permitting limited angular movement relative to the nozzle means, said member defining at least one opening adapted to effect passage of motive fluid to the rotor in one position and to restrict passage of fluid in another position, said movable member including an axially extending substantially cylindrical portion radially spaced from the periphery of an unbladed disk portion of the rotor, said rotor portion being adapted to stretch radially upon reaching a predetermined speed into engagement with said axially extending portion whereby the movable member is caused to move to the fluid restricting position.

4. In a turbine comprising a casing, a bladed rotor rotatably supported in the casing, and nozzle means for directing motive fluid through the bladed rotor, speed limiting means comprising in combination an angularly movable member with a plurality of circumferentially spaced axially extending rollers engaging a cylindrical portion of the casing and radially spaced from the periphery of an unbladed disk portion of the rotor, means for restraining said member from axial movement while permitting limited angular movement relative to the nozzle means, said member including a portion extending between the nozzle means and the rotor blading and defining at least one opening adapted to effect flow of motive fluid to the rotor in one position and to restrict the flow of fluid in another position, said disk portion being adapted to stretch radially upon attaining a predetermined speed into engagement with said rollers whereby said member is caused to move to the fluid restricting position.

DOUGLAS H. GRAHAM.
BENGT E. G. FORSLING.
GEORGE TABBERER.

No references cited.